June 18, 1935.  H. J. BERTRAM  2,005,516
RHEOSTAT
Filed April 21, 1932
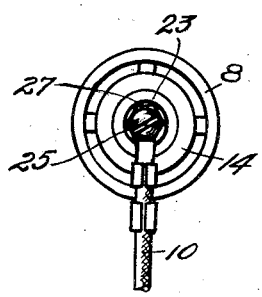
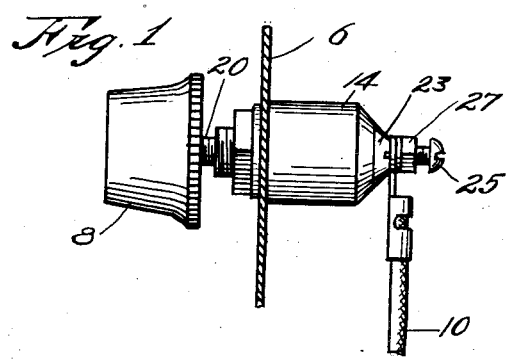
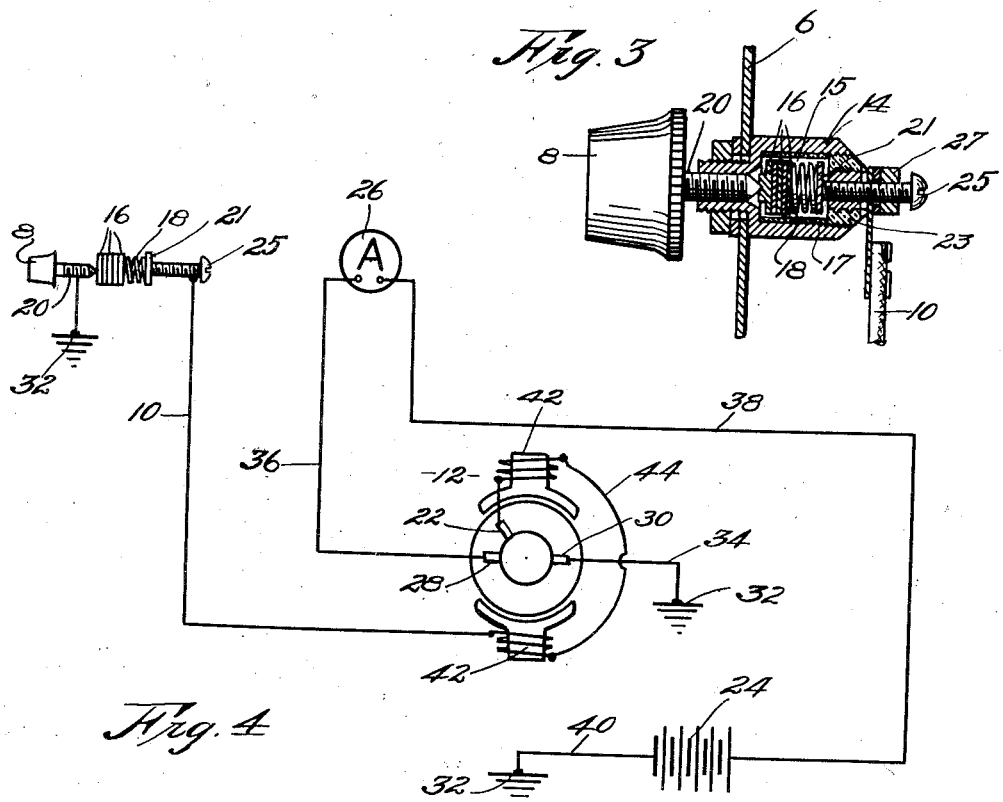
INVENTOR,
Henry J. Bertram.
BY
Hovey & Hamilton,
ATTORNEYS.

Patented June 18, 1935

2,005,516

UNITED STATES PATENT OFFICE 2,005,516

RHEOSTAT

Henry J. Bertram, Kansas City, Mo.

Application April 21, 1932, Serial No. 606,587

1 Claim. (Cl. 201—51)

This invention relates to electromotive force generating apparatus and is especially designed to be built into and combined with generating apparatus for automobiles, and the primary object of the invention is the provision of a variable resistance element for such generating equipment which may be associated with the shunt circuit of a shunt-wound generator.

One of the objects of this invention is to provide a manually controllable, variable resistance element that may be associated with the charging apparatus for automobiles and positioned on the instrument board within easy reach of the driver, and which may be manipulated to vary the electromotive force output as the speed of the automobile or contemplated length of a trip is changed.

It is known that the ordinary charging apparatus for automobiles is equipped with means whereby the output thereof to the storage battery might be altered by adjusting certain parts and by having one skilled in the business to adjust parts of the generator which may be reached through the use of special equipment. It is also known that over-charging sometimes occurs when long trips are taken and it becomes necessary at such times to burn the lights of the automobile to preclude such action and its dangerous results.

This invention contemplates the use of a novel attachment operable from the driver's seat, which is connected in series with the aforementioned shunt circuit, having plates of different conductive properties and means to vary the pressure holding together said plates.

The advantages of such an attachment are obvious and with the foregoing general objects in view, the specific form and structure of a preferred embodiment of the invention will now be made clear by reference to the accompanying trollable knob 8 must be within easy reach of the driver of the automobile and suitable connections must be made to the attachment through grounding to said instrument board and any necessary wire leads 10, whereby to connect in series the resistance device with the shunt circuit of the generator 12.

The device itself may be constructed to include body 14, cored out to create cavity 15 to form a housing for a series of plates 16 which are grouped together within body 14 and insulated therefrom by lining 17 as illustrated in Fig. 3. Plates 16 are formed of material having different conductive properties and the group of plates 16 is engaged at its one side by a spring or analogous yieldable member 18, while the other side of the group of plates is engaged by knob 8.

Specifically, screw-threaded shank 20 of knob 8 actually bears against one side of the group of plates 16. Turning knob 8 and shank 20 in the appropriate direction causes a movement toward and from the group of plates 16 and this action compresses or allows expansion on the part of spring 18 to set up a greater or lesser pressure to hold together the plurality of plates 16.

The operation above set down causes the series of plates 16 to vary their conductive property, and when the same are included in an electrical circuit, the pressure holding them together determines the amount of resistance which they set up in said circuit.

Cavity 15 has an inside diameter sufficiently greater than the diameter of plates 16 to allow clearance when insulating lining 17 is in place. These parts of the device are inserted through the open end of body 14 as is spring 18 and a disk 21. After assembly, ring 23 may be positioned through the medium of appropriate screw-threads. Ring 23 is of insulating material to positively preclude current from passing Since knob 8 and shank 20 are not functioning when this setting takes place, any movement on their part after setting will place greater pressure against plates 16 and gradually increase the output of electromotive force rather than ever decreasing the same from the said predetermined minimum output. After installation screw 25 need never be adjusted.

A shunt-wound generator 12 is diagrammatically illustrated in Fig. 4, and a movable brush 22 is likewise shown to establish the possibility of altering the electromotive force output of generator 12 to suit the requirements of the particular make of automobile with which the generating apparatus is associated. After movable brush 22 is set and a further setting of the device here contemplated, to insure a minimum output by generator 12, is made, the owner of the automobile alters the electromotive force input to storage battery 24 by merely manipulating the attachment at the instrument board.

As illustrated in Fig. 4, the attachment is connected in series with the shunt circuit of generator 12, the resistance of which is varied to change the generator output. That is to say, when the resistance of the shunt circuit is altered, output from generator 12 through the external circuit is altered in accordance with the change in the resistance of the shunt circuit. An ammeter 26 is usually interposed in the external circuit of the generating apparatus, through which passes the charge, whereby to indicate to the driver the output strength of generator 12. In the type of generator illustrated, there are two stationary brushes 28 and 30 respectively, the latter of which is attached to any suitable ground 32 by wire 34. A conductor 36 leads from stationary brush 28 to ammeter 26, and suitable wires or other conducting means 38 join ammeter 26 and storage battery 24. The external circuit is completed by connection 40 which joins battery 24 to ground 32.

The two shunt-wound field magnets 42 form a part of generator 12 and are joined by conductor 44 in the well known manner. Stationary brush 30 and wire 34 combine with movable brush 22, field magnets 42, and their connecting conductor 44, wire 10 and, again, ground 32, to set up the complete shunt circuit, within which is interposed the variable resistance attachment hereinbefore described.

The external circuit forming a part of the charging apparatus is quickly followed by referring to Fig. 4, and may be established from ground 32 back to ground 32 as follows: Wire 34 to fixed brush 30 of generator 12, fixed brush 28 to conductor 36, through ammeter 26 to conducting means 38, to battery 24, and thence to connection 40 which leads to ground 32.

Operation of generating apparatus such as set down herein is very well known. The same has been described merely to render clear the exact combination which is set up when a variable resistance attachment contemplated by this invention is used therewith.

Materials from which plates 16 are made need not be of a specific kind, so long as the conductive properties of the plates forming the group are different and so long as the pressure exerted upon plates 16 causes a variation in the resistance which they establish in the shunt circuit.

Having thus described the invention, what is claimed as new and desired to be secured by Letters Patent is:

A rheostat of the character described comprising a body having a cavity formed therein; internal threads formed in the body wall adjacent one end thereof; an externally and internally threaded portion of reduced diameter at the other end of said body whereby to form an annular shoulder on the body; a manually operable control knob having a threaded shank in engagement with the internal threads of the portion of reduced diameter; a threaded collar of insulating material having a screw adjustably carried thereby closing one end of said body in opposed relation to the said threaded shank; a plurality of superimposed plates of different electrical conductive properties positioned in a pile in said cavity between the said manually operable control knob shank and the said screw; and a compression spring between two of said disks of the pile, the said reduced portion of said body having a nut in screwthreaded engagement therewith for movement toward and from the said annular shoulder whereby to secure a support therebetween to hold the rheostat in operative position.

HENRY J. BERTRAM.